(12) United States Patent
Ogawa et al.

(10) Patent No.: US 8,474,791 B2
(45) Date of Patent: Jul. 2, 2013

(54) GATE VALVE

(75) Inventors: Hiroshi Ogawa, Okegawa (JP); Takeshi Nishikawa, Abiko (JP); Jiro Ishibe, Nagareyama (JP)

(73) Assignee: SMC Kabushiki Kaisha, Tokyo (JP)

( * ) Notice: Subject to any disclaimer, the term of this patent is extended or adjusted under 35 U.S.C. 154(b) by 133 days.

(21) Appl. No.: 13/215,601

(22) Filed: Aug. 23, 2011

(65) Prior Publication Data
US 2012/0068100 A1   Mar. 22, 2012

(30) Foreign Application Priority Data

Sep. 22, 2010 (JP) ................................ 2010-212842

(51) Int. Cl.
*F16K 25/00* (2006.01)
(52) U.S. Cl.
USPC .......................................... 251/203; 251/326
(58) Field of Classification Search
USPC ................... 251/193, 203, 204, 326
See application file for complete search history.

(56) References Cited

U.S. PATENT DOCUMENTS 5,415,376 A    5/1995  Ito
6,390,449 B1 *  5/2002  Ishigaki et al. ............... 251/193

FOREIGN PATENT DOCUMENTS
JP        2613171       2/1997

* cited by examiner

*Primary Examiner* — John K Fristoe, Jr.
*Assistant Examiner* — Kevin E Lynn
(74) *Attorney, Agent, or Firm* — Oblon, Spivak, McClelland, Maier & Neustadt, L.L.P.

(57) ABSTRACT

Roller insertion grooves are formed along the longitudinal direction of inner wall portions of side frames, which are provided in the interior of a housing that makes up a gate valve. Respective pairs of retaining rollers are inserted into the roller insertion grooves. A valve disk is tilted, such that in a valve closed state in which the valve disk is seated on a valve seat, a load imposed from a displacement block, which is connected to a valve rod and tiltably displaced thereby, is imposed on the retaining rollers, the load being borne by first and second pressure receiving bodies, which abut against the retaining rollers and are disposed on the side frames. The first and second pressure receiving bodies are formed from a material having a hardness greater than that of the side frames.

8 Claims, 11 Drawing Sheets

GATE VALVE

CROSS-REFERENCE TO RELATED APPLICATION

This application is based upon and claims the benefit of priority from Japanese Patent Application No. 2010-212842 filed on Sep. 22, 2010, of which the contents are incorporated herein by reference.

BACKGROUND OF THE INVENTION

1. Field of the Invention

The present invention relates to a gate valve, which is capable of opening and closing a transfer passage through which a workpiece is transferred from one processing chamber into another processing chamber, or of opening and closing a fluid passage or a discharge passage through which a pressure fluid, a gas, or the like flows.

2. Description of the Related Art

Heretofore, in processing apparatus for semiconductor wafers, liquid crystal substrates or the like, the semiconductor wafers, liquid crystal substrates or the like are fed in and out through passages into various processing chambers, and gate valves are used in such passages for opening and closing the passages.

In such a gate valve, for example, as disclosed in Japanese Patent No. 2613171, after a valve disk reaches a confronting position of a valve sheet by translatory movement of a valve rod, which is displaced under a driving action of a cylinder, the valve rod is tilted, whereby the valve disk is pressed against and seated on the valve seat, and a passage formed in a valve box is sealed.

SUMMARY OF THE INVENTION

Recently, along with improvements in space economization in manufacturing plants for semiconductor wafers and the like, it has been desired to further miniaturize gate valves that constitute and are used in processing apparatus. Further, there is a demand that a valve closed state in which the valve disk is seated on the valve seat be maintained reliably and stably.

A general object of the present invention is to provide a gate valve, which is capable of reliably and stably maintaining the valve closed state of a valve disk, together with suppressing the height dimension and thereby contributing to miniaturization of the gate valve.

The present invention is a gate valve equipped with a valve box, a valve disk displaceable for being seated on a valve seat formed in the valve box, a valve rod connected to the valve disk for moving the valve disk along a straight line as well as tiltably moving the valve disk, and a driving section disposed in a housing connected to the valve box for linearly displacing the valve rod in an axial direction, the gate valve comprising:

a yoke connected to a drive shaft of the driving section and which is displaced along the axial direction under a driving action of the driving section;

a displacement member displaced integrally with the yoke, and which is tiltable at a terminal position along the axial direction;

an engagement member disposed on a side of the displacement member and having a hole therein into which a first roller mounted on the displacement member is inserted;

a frame disposed parallel to the axial direction of the valve rod and having a groove that extends along the axial direction;

a second roller disposed on the engagement member and which is inserted into the groove; and a pressure receiving member disposed to face toward the groove and which abuts against the second roller in a valve closed state in which the valve disk is seated on the valve seat, wherein the valve rod, the displacement member and the driving section are arranged in parallel in interior of the housing, and the pressure receiving member is formed from a material having a hardness greater than that of the frame.

According to the present invention, by arranging the driving section in parallel with the valve rod and the displacement member, compared to a case of arranging the driving section and the displacement member together along a straight line, the height dimension of the gate valve can be suppressed, along with enabling miniaturization of the gate valve. Further, if the valve disk is seated on the valve seat in a valve closed state, a load in a substantially horizontal direction, which is imposed from the tilted displacement member on the second rollers via the engagement member, can be borne reliably and suitably by the pressure receiving members that abut against the second rollers, thereby maintaining the valve closed state reliably and stably.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

As shown in FIGS. 1 through 7, a gate valve 10 is equipped with a valve box 14, in which a passage 12 is formed through which a non-illustrated workpiece (e.g., a semiconductor wafer) is fed in and out, a housing 16 connected to an upper part of the valve box 14, and a cylinder assembly 18, which functions as a driving section, disposed in the interior of the housing 16.

The gate valve 10 further includes a valve rod 20, which is displaced along an axial direction (the direction of arrows A and B) under a driving action of the cylinder assembly 18, and which is tilted through a predetermined angle with respect to the axial direction, a valve disk 22 connected to one end of the valve rod 20 and which is capable of blocking and sealing the passage 12, a drive converter 24 for converting linear displacement of the cylinder assembly 18 into tilting motion of the valve rod 20, and a retaining mechanism 26 capable of maintaining the blocked state by the valve disk 22.

The valve box 14 is formed as a hollow box having the passage 12 that penetrates in a rectangular form from one end surface to the other end surface thereof. Further, a space is provided in the interior of the valve box 14 through which the later-described valve disk 22 is capable of moving. A valve seat 28 is formed on an inner wall surface of the space so as to face toward one end of the passage 12. The valve seat 28 is formed so as to be capable of abutment against the valve disk 22. Opposite side surfaces of the valve box 14 are connected respectively to non-illustrated processing chambers, and communicate with the interior of the processing chambers through the passage 12.

The housing 16 is made up from a base 30 connected to an upper portion of the valve box 14, a pair of side frames 32a, 32b that are connected to opposite ends of the base 30 sandwiching the cylinder assembly 18 therebetween, and a cover member 34 that interconnects respective upper and portions of the side frames 32a, 32b. The base 30 is disposed so as to cover the upper portion of the valve box 14. The interior of the valve box 14 and the interior of the housing 16 are held in communication by a rod hole 36, which is formed in a substantially central portion of the valve box 14. The later-described valve rod 20 is inserted displaceably through the rod hole 36.

The side frames 32a, 32b are formed, for example, from a metallic material such as aluminum or the like. Cylinder tubes 44 that constitute the cylinder assembly 18 are provided respectively on lower parts of the side frames 32a, 32b. The side frames 32a, 32b are fixed together with the cylinder tubes 44 with respect to the base 30.

First and second ports 38, 40 for supplying and discharging a pressure fluid with respect to the cylinder assembly 18 are formed on one of the side frames 32a. The first and second ports 38, 40 open respectively and are separated mutually a predetermined interval along the longitudinal direction of the side frame 32a. The first and second ports 38, 40 are connected through a non-illustrated tube to a pressure fluid supply source, and as described in greater detail below, communicate respectively with interiors of the cylinder tubes 44 of the cylinder assembly 18.

The cylinder assembly 18 is made up from a pair of fluid pressure cylinders 42a, 42b, which are disposed respectively in the housing 16 on opposite ends along the longitudinal direction of the base 30. The fluid pressure cylinders 42a, 42b include, respectively, the hollow cylindrical cylinder tubes 44, pistons 46 disposed for displacement along an axial direction (the direction of arrows A and B) inside the cylinder tubes 44, and piston rods (drive shafts) 48 connected to the pistons 46.

Ends of the cylinder tubes 44 are blocked and sealed as a result of being connected to the base 30, whereas the other ends thereof are blocked by rod caps 50, through which the piston rods 48 are inserted. Further, in the interiors of the cylinder tubes 44, upper side cylinder chambers 52 and lower side cylinder chambers 54 are formed, which are separated by the pistons 46. Additionally, in a case where pressure fluid is supplied to the first port 38 or the second port 40 from a non-illustrated pressure fluid supply source, the pressure fluid is selectively supplied to either one of the upper side cylinder chambers 52 or the lower side cylinder chambers 54, through communication passages 55a, 55b formed in the interior of the side frame 32a.

The first port 38 and the second port 40 also are connected respectively through non-illustrated passages to the upper side cylinder chamber 52 and the lower side cylinder chamber 54 in the fluid pressure cylinder 42b.

Thus, by the pressure fluid, which is supplied to either one of the upper side cylinder chambers 52 or the lower side cylinder chambers 54, the pistons 46 are pressed in the axial direction (the direction of arrows A and B) and are displaced together with the piston rods 48.

Lower ends of the piston rods 48 are connected with respect to central portions of the pistons 46, while upper ends thereof project outside of the cylinder tubes 44 and are connected respectively to a later-described yoke 60 in a floating manner.

The valve rod 20 is disposed in a roughly central portion of the housing 16, and is inserted through the rod hole 36 formed in the base 30, a substantially center portion of the valve rod 20 being covered by a cylindrical bellows 56. The bellows 56 is cylindrically shaped and is disposed to confront the rod hole 36. One end of the bellows 56 is engaged with an annular groove provided on the valve rod 20, and the other end thereof is connected to the opening of the rod hole 36.

In a case where the valve rod 20 is displaced along the axial direction (the direction of arrows A and B), the bellows 56 undergoes expanding and contracting movements in a state of covering the valve rod 20, so that a portion of the valve rod 20 is always covered by the bellows 56.

Further, the lower end of the valve rod 20 is inserted into the interior of the valve box 14 and is connected to the valve disk 22.

The valve disk 22 is made up from a plate, which is roughly rectangular in cross section corresponding to the opening of the passage 12 in the valve box 14. The valve rod 20 is connected to a substantially central part of the valve disk 22, and a sealing ring 58 is installed through an annular groove on a side surface thereof that confronts the valve seat 28. In a valve closed state in which the valve disk 22 is seated on the valve seat 28, the sealing ring 58 abuts against the valve seat 28, whereby the state of communication of the passage 12 is blocked by the valve disk 22.

The drive converter 24 includes the yoke 60, which is fixed to other ends of the piston rods 48, a displacement block (displacement member) 62 formed with an H-shape in cross section and which is displaced integrally with the yoke 60, and engagement brackets 64 fixed to opposite side surfaces of the displacement block 62 and which project predetermined lengths in the lateral direction.

The yoke 60 is disposed perpendicularly to the axial direction of the piston rods 48, the pair of piston rods 48 in the fluid pressure cylinders 42a, 42b being connected respectively to opposite ends of the yoke 60. Consequently, in a case where the piston rods 48 are displaced together with the pistons 46 upon supply of the pressure fluid, the yoke 60 is displaced integrally with the piston rods 48. Stated otherwise, the pair of pistons 46 and the piston rods 48 are displaced together integrally in the axial direction (the direction of arrows A and B) via the yoke 60.

An upper end of the valve rod 20 is inserted through and projects in a substantially central portion of the displacement block 62. A connecting nut 66 is screw-engaged with the upper end projecting part of the valve rod 20, whereby the displacement block 62 is connected integrally with the valve rod 20. A spring 68 made, for example, from a coil spring is interposed between the connecting nut 66 and the yoke 60. The yoke 60 and the displacement block 62 are urged by an elastic force of the spring 68 in directions (the directions of arrows A and B) to separate from one another. A spring receiving recess 70 is formed in the yoke 60, into which one end of the spring 68 is inserted.

Further, a pair of support rollers 72 are disposed and supported axially for rotation, so as to project outwardly from opposite side surfaces on a lower end portion of the displacement block 62. Additionally, if the displacement block 62 is lowered, the support rollers 72 are inserted into and supported respectively by support blocks 76 formed on an upper surface of the base 30 and having recesses 74 therein that open upwardly. Dampers 77 are provided respectively in the support blocks 76 facing the recesses 74 and project slightly therefrom.

More specifically, if the support rollers 72 are inserted into the recesses 74, shocks are absorbed by abutment of the support rollers 72 against the dampers 77. The recesses 74 are formed with semicircular shapes in cross section, corresponding to the cross sectional shape of the support rollers 72.

Furthermore, on an upper end of the displacement block 62 projecting outwardly from side surfaces thereof, a pair of tilt rollers (first rollers) 78 are provided and rotatably supported. The tilt rollers 78 are inserted respectively into roller grooves (holes) 82 of connecting blocks (engagement members) 80, which are connected to the lower surface of the yoke 60. The tilt rollers 78 are disposed on opposite side surfaces of the displacement block 62 on straight lines with the support rollers 72.

Figure 4:
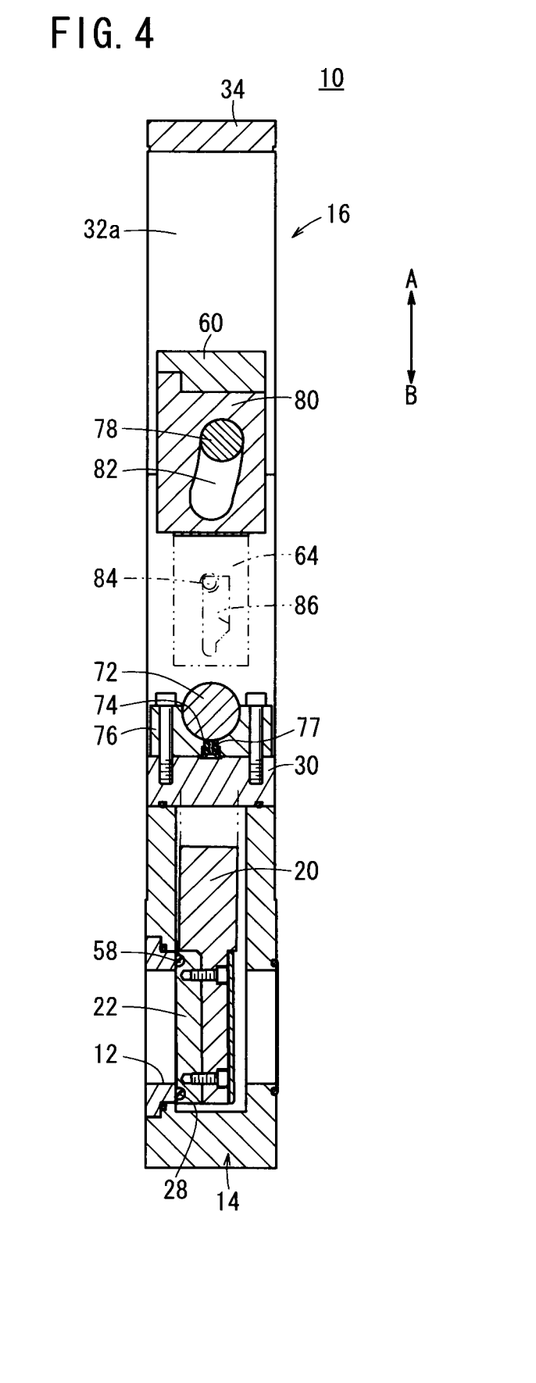
FIG. 4 is a cross sectional view taken along line IV-IV of FIG. 1.

The roller grooves 82 are formed with substantially elliptical shapes, and a recessed with respect to side surfaces of the connecting blocks 80 facing toward the displacement block 62. As shown in FIG. 4, lower ends of the roller grooves 82 extend in an inclined fashion with respect to the upper ends thereof toward the side of the valve seat 28 of the valve box 14. Stated otherwise, the roller grooves 82 are inclined at a predetermined angle with respect to the longitudinal direction (the direction of arrows A and B) of the connecting blocks 80.

In addition, by displacement of the connecting blocks 80 upwardly and downwardly together with the yoke 60 under a driving action of the cylinder assembly 18, the tilt rollers 78 are displaced along the roller grooves 82, and along therewith, the displacement block 62 is tilted about the support rollers 72, i.e., the support rollers 72 act as a fulcrum about which the displacement block 62 is tilted.

The engagement brackets 64, for example, are formed from plate-like members, which are L-shaped in cross section, having engagement grooves 86 formed therein into which pin members 84 provided on opposite side surfaces of the displacement block 62 are inserted. The pin members 84 are supported on lower end portions of the engagement grooves 86. As a result, if the valve disk 22 is lowered, positional shifting of the valve disk 22 and the displacement block 62 in the axial direction and in directions perpendicular thereto is prevented. In addition, by elevation of the pin members 84 away from lower ends of the engagement grooves 86, the valve rod 20 and the valve disk 22 are made capable of tilting.

The retaining mechanism 26 is disposed inside the side frames 32a, 32b in the housing 16, and is disposed at a position above the pair of fluid pressure cylinders 42a, 42b, respectively.

The retaining mechanism 26 is disposed between upper portions of the cylinder tubes 44 and the cover member 34, and is made up from two pairs of retaining rollers (second rollers) 90a, 90b, which are inserted into roller insertion grooves (grooves) 89 of inner wall portions 88a, 88b of the side frames 32a, 32b.

The roller insertion grooves 89 extend along the axial direction (the direction of arrows A and B) of the inner wall portions 88a, 88b by a predetermined length, and are formed with width dimensions that are slightly greater than the diameters of the retaining rollers 90a, 90b.

Further, on lower parts of the inner wall portions 88a, 88b, a pair of recesses are formed on inner side surfaces thereof facing toward the roller insertion grooves 89. First and second pressure receiving bodies (pressure receiving members) 92, 94 are provided respectively in the recesses. The first and second pressure receiving bodies 92, 94, for example, are formed with substantially rectangular shapes in cross section from a metallic material (heat treated tempered steel or the like) having a hardness greater than that of the side frames 32a, 32b. Further, the first and second pressure receiving bodies 92, 94 are formed so as to be substantially flush with the inner wall surfaces of the roller insertion grooves 89 (see FIG. 5) without projecting therefrom.

In greater detail, the first pressure receiving bodies 92 and the second pressure receiving bodies 94 are offset a predetermined distance along the axial direction (the direction of arrows A and B) of the side frames 32a, 32b, such that in a case where the passage 12 is blocked by the valve disk 22, the two pairs of retaining rollers 90a, 90b abut respectively against the first and second pressure receiving bodies 92, 94. The first pressure receiving bodies 92 are disposed in a lower position (in the direction of arrow B) on the side of the valve box 14.

The retaining rollers 90a, 90b are axially supported for rotation on side surfaces of the connecting blocks 80, and are disposed on a straight line while being separated mutually a predetermined distance along the longitudinal direction (the direction of arrows A and B) of the connecting blocks 80. Additionally, if the connecting blocks 80 are displaced together with the yoke 60, the retaining rollers 90a, 90b are displaced along the roller insertion grooves 89, whereby the yoke 60, the displacement block 62, and the valve rod 20 are guided through the connecting blocks 80 along the axial direction (the direction of arrows A and B).

Figure 8:
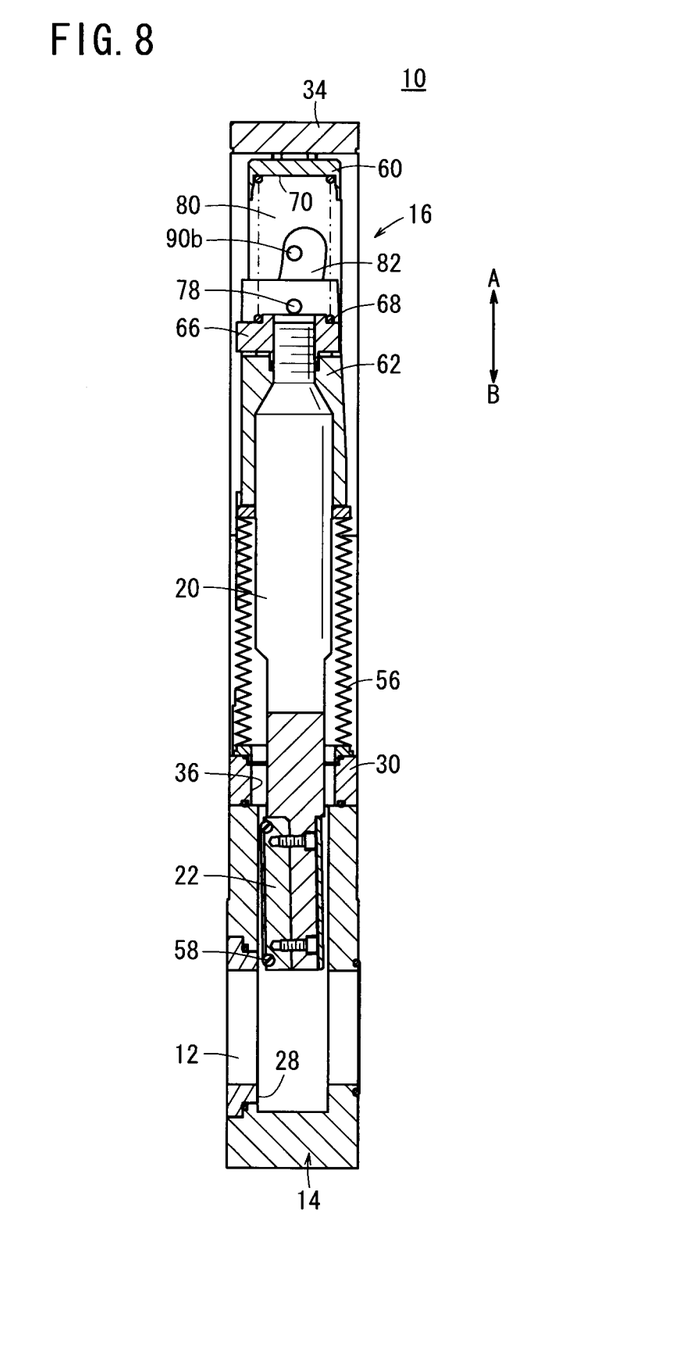
FIG. 8 is a vertical cross sectional view showing a valve open state in which a valve disk and a valve rod shown in FIG. 3 are displaced upwardly.
Figure 9:
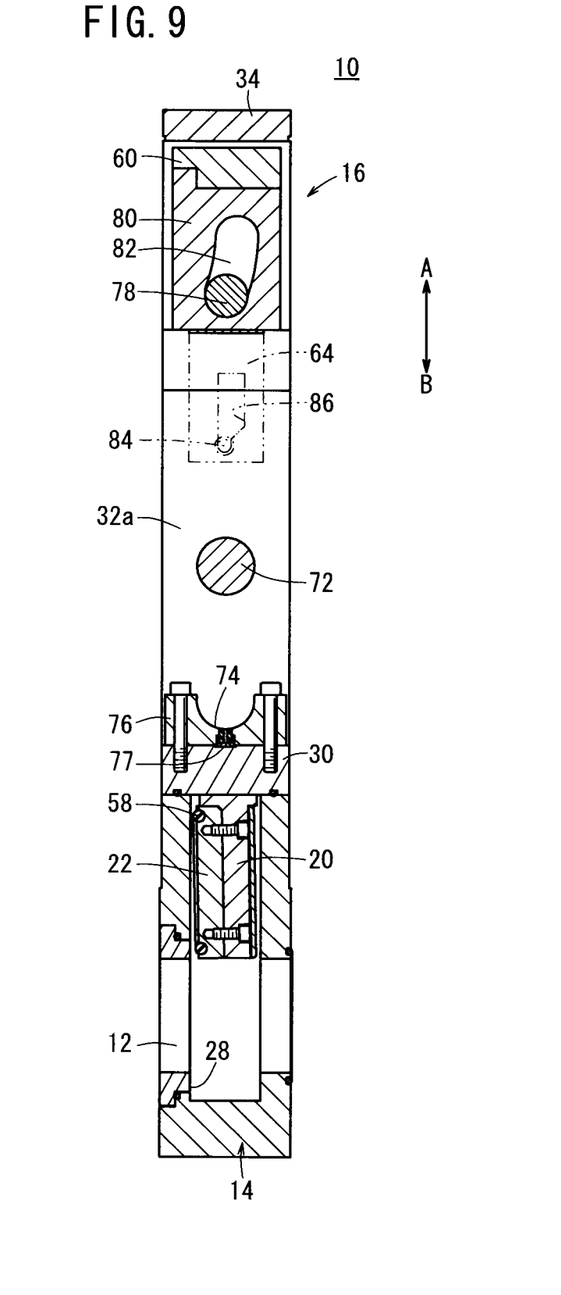
FIG. 9 is a vertical cross sectional view showing a valve open state in which a valve disk and a valve rod shown in FIG. 4 are displaced upwardly.
Figure 10:
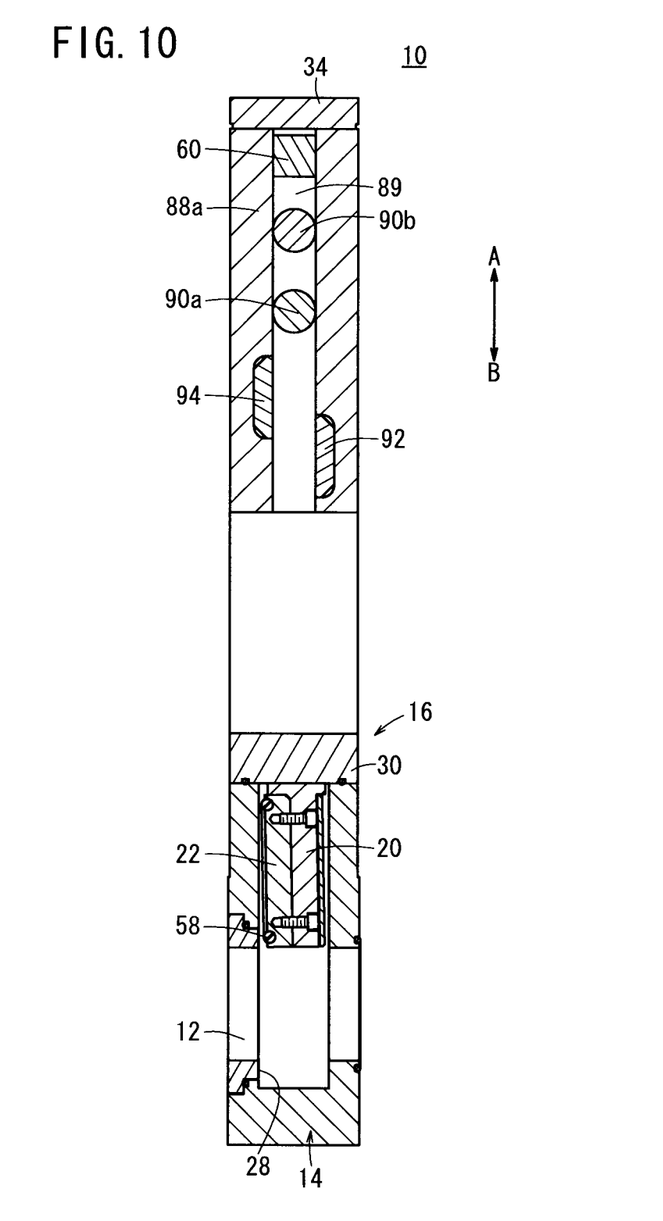
FIG. 10 is a vertical cross sectional view showing a valve open state in which a valve disk and a valve rod shown in FIG. 5 are displaced upwardly.

The gate valve 10 according to the embodiment of the present invention is constructed basically as described above. Next, operations and advantages of the gate valve 10 shall be explained. In the following explanations, as shown in FIGS. 8 through 10, a valve open state is described as an initial position, in which the pistons 46 that constitute the cylinder assembly 18 are moved upwardly (in the direction of arrow A) and the valve disk 22 is displaced upwardly in the valve box 14, whereby the passage 12 is opened for communication.

First, in the initial position, by supplying a pressure fluid to the first port 38 from a non-illustrated pressure fluid supply source, the pressure fluid is introduced into the upper side cylinder chambers 52 in the cylinder assembly 18, and the pistons 46 are pressed and displaced downward (in the direction of arrow B). At this time, the second port 40 is placed in a state of being open to atmosphere.

Figure 7:
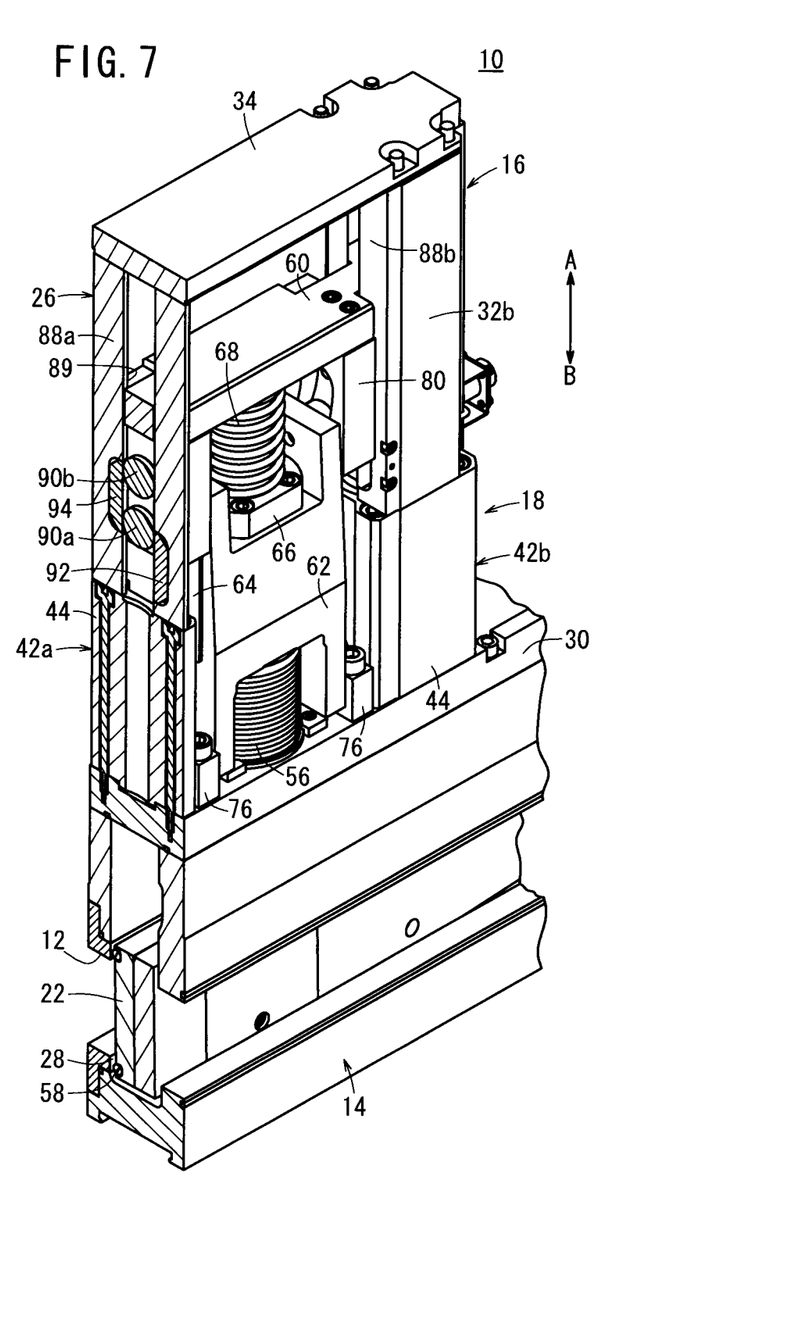
FIG. 7 is a perspective view, with a partial cutout cross section, of the gate valve shown in FIG. 5.

Along with displacement of the pistons 46, the yoke 60, the connecting blocks 80, and the displacement block 62 are lowered integrally therewith. Owing thereto, as shown in FIGS. 4 and 7, the valve rod 20 and the valve disk 22 are lowered, and the support rollers 72 of the displacement block 62 are placed in terminal end positions upon insertion thereof into the recesses 74 of the support blocks 76. More specifically, further downward movement of the valve rod 20 and the valve disk 22 is regulated, and the valve disk 22 is positioned to confront the passage 12 and the valve seat 28 inside the valve box 14.

In this case, because the valve disk 22 is not yet seated on the valve seat 28 and a valve closed state is not created, the passage 12 of the valve box 14 is still maintained in a state of communication.

Furthermore, if the displacement block 62 is lowered, because the elastic force of the spring 68 is larger than the pressing force from the yoke 60, the spring 68 is not compressed by the yoke 60, and the spring 68 is displaced together integrally with the yoke 60 and the displacement block 62.

Figure 11:
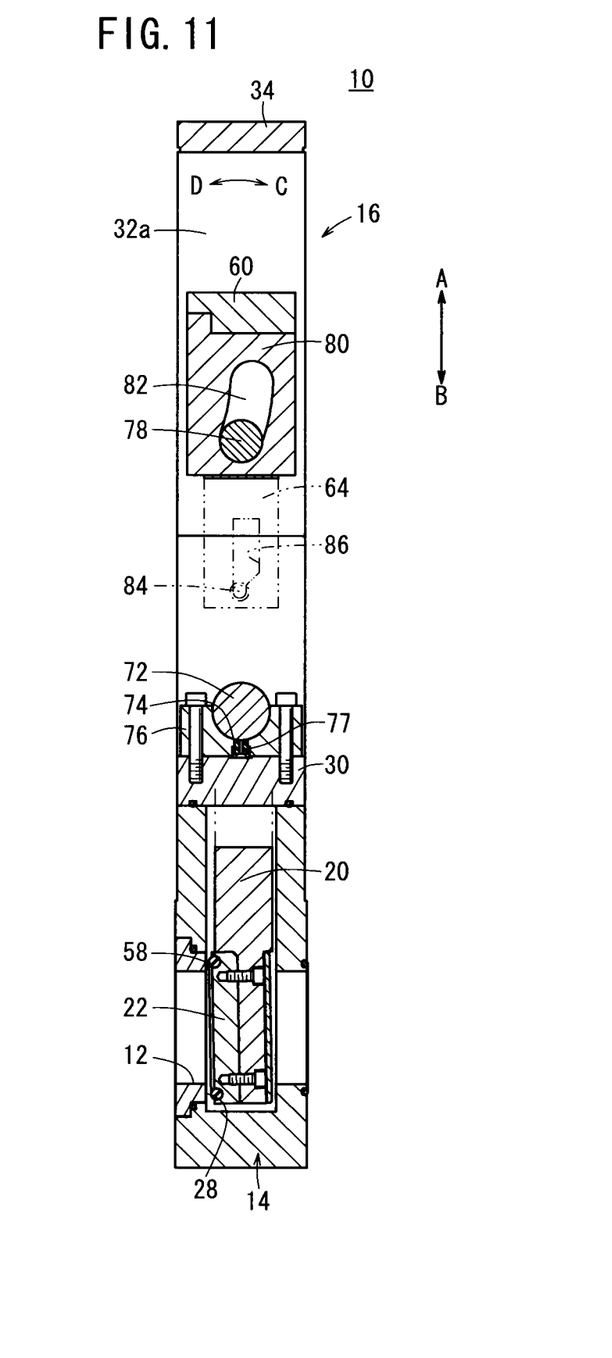
FIG. 11 is a vertical cross sectional view showing a state in which a valve disk and a valve rod shown in FIG. 9 are displaced downwardly, and the valve disk is moved into the interior of a valve box.

Next, from the state shown in FIG. 11 in which the valve disk 22 is arranged at a position confronting the valve seat 28, by further introducing more of the pressure fluid into the upper side cylinder chambers 52, the pistons 46 are lowered further, whereby the yoke 60 is pulled downward (in the direction of arrow B) by the piston rods 48. At this time, because downward movement of the displacement block 62 is regulated by the support blocks 76, the yoke 60 is displaced downward while compressing the spring 68, and the connecting blocks 80 are lowered integrally therewith. Thus, by engagement with the tilt rollers 78, the upper end of the displacement block 62 is tilted clockwise (in the direction of arrow C in FIG. 11) by a predetermined angle about the support rollers 72 (see FIG. 4).

Figure 1:
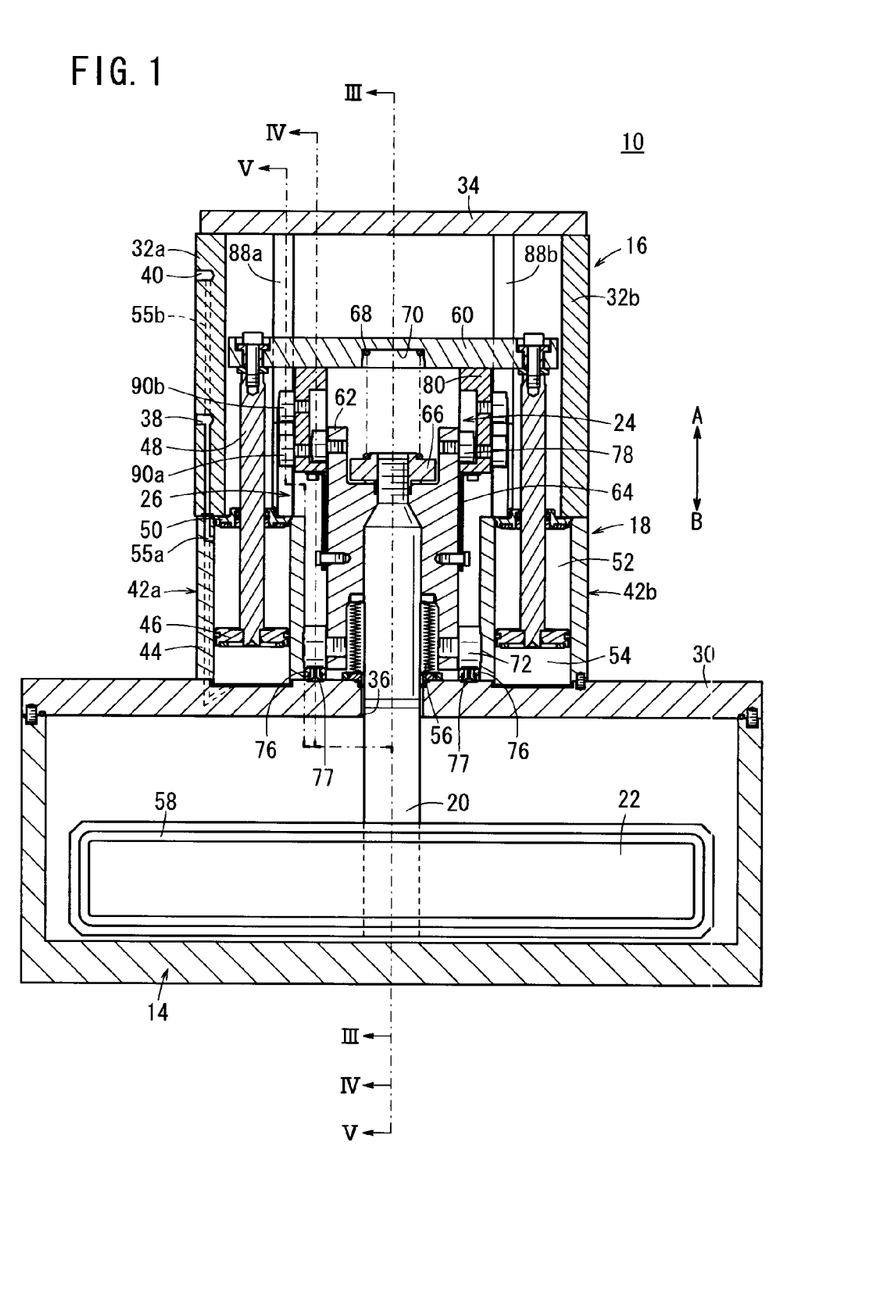
FIG. 1 is an overall vertical cross sectional view of a gate valve according to an embodiment of the present invention.
Figure 2:
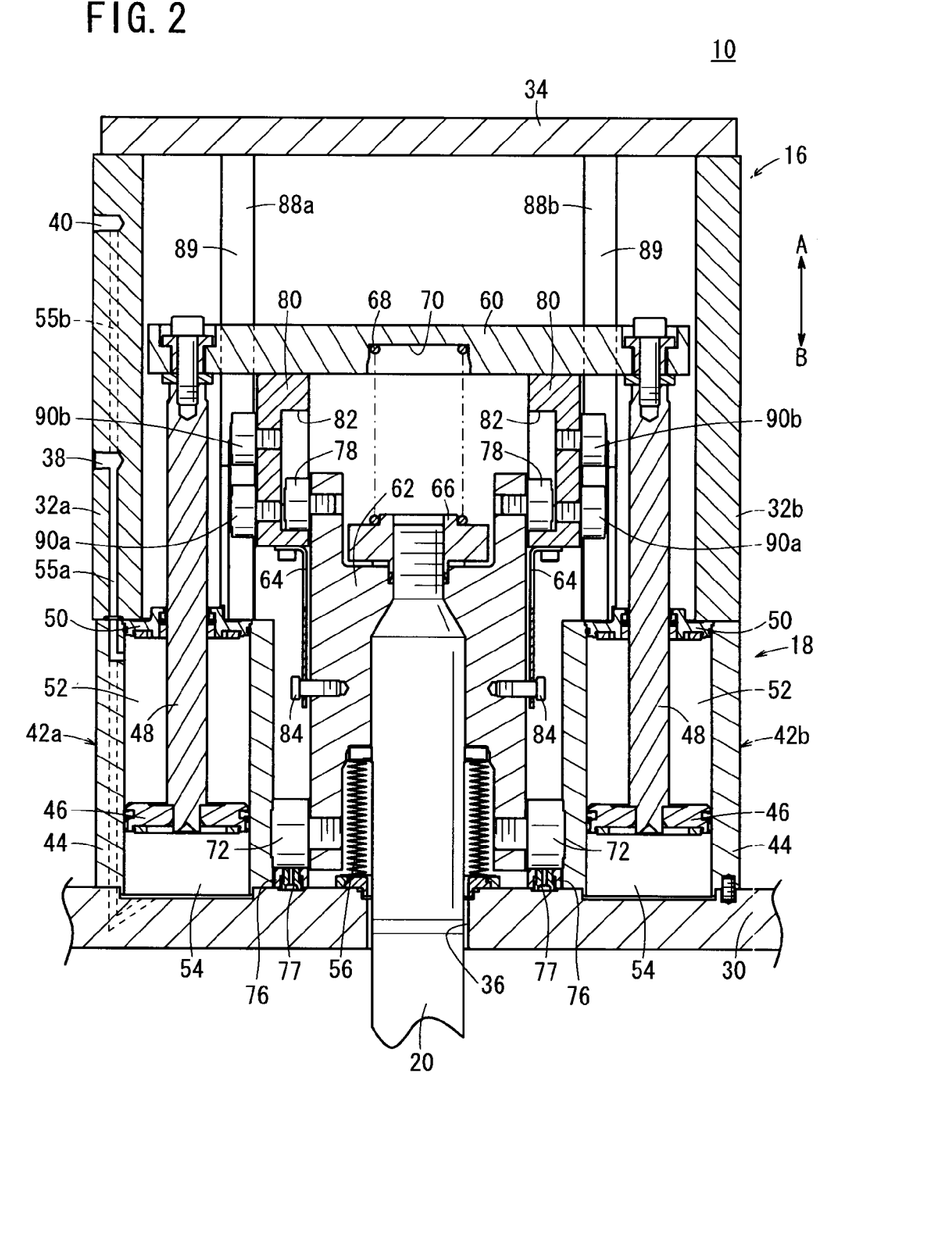
FIG. 2 is an enlarged cross sectional view in the vicinity of a housing shown in FIG. 1.
Figure 3:
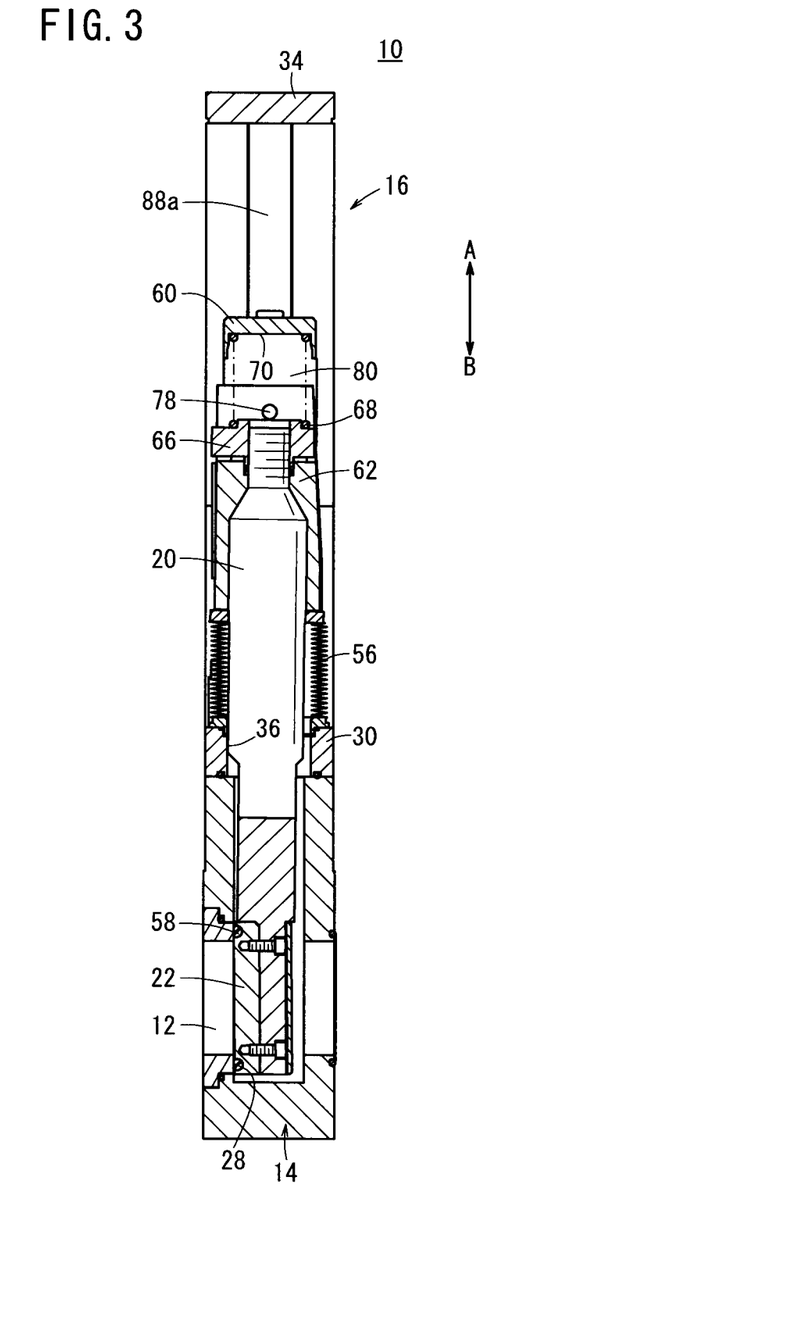
FIG. 3 is a cross sectional view taken along line III-III of FIG. 1.
Figure 5:
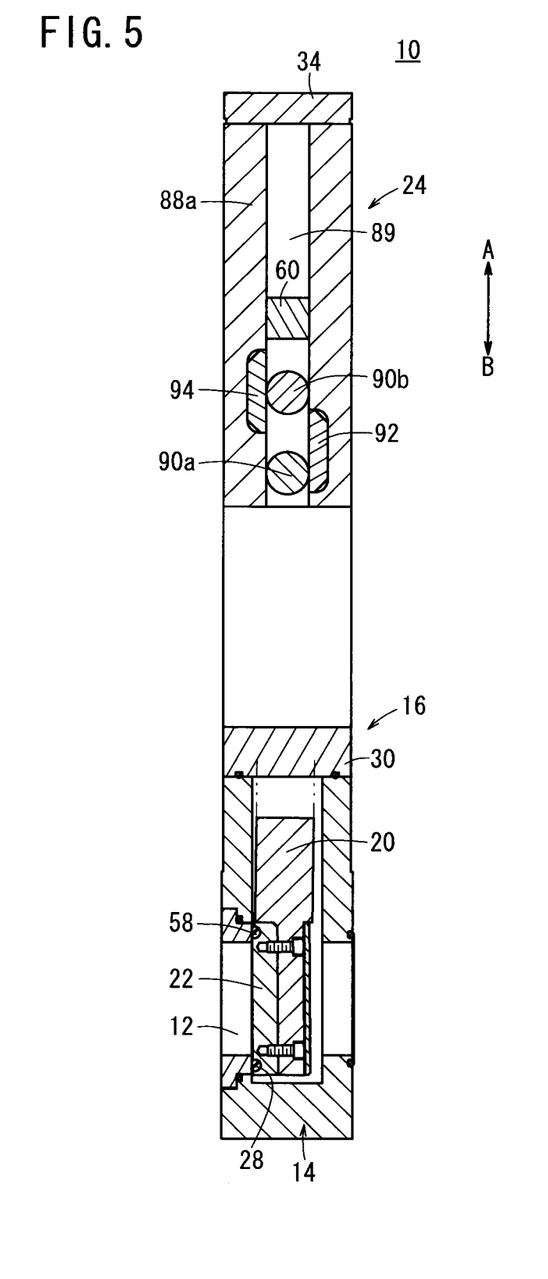
FIG. 5 is a cross sectional view taken along line V-V of FIG. 1.
Figure 6:
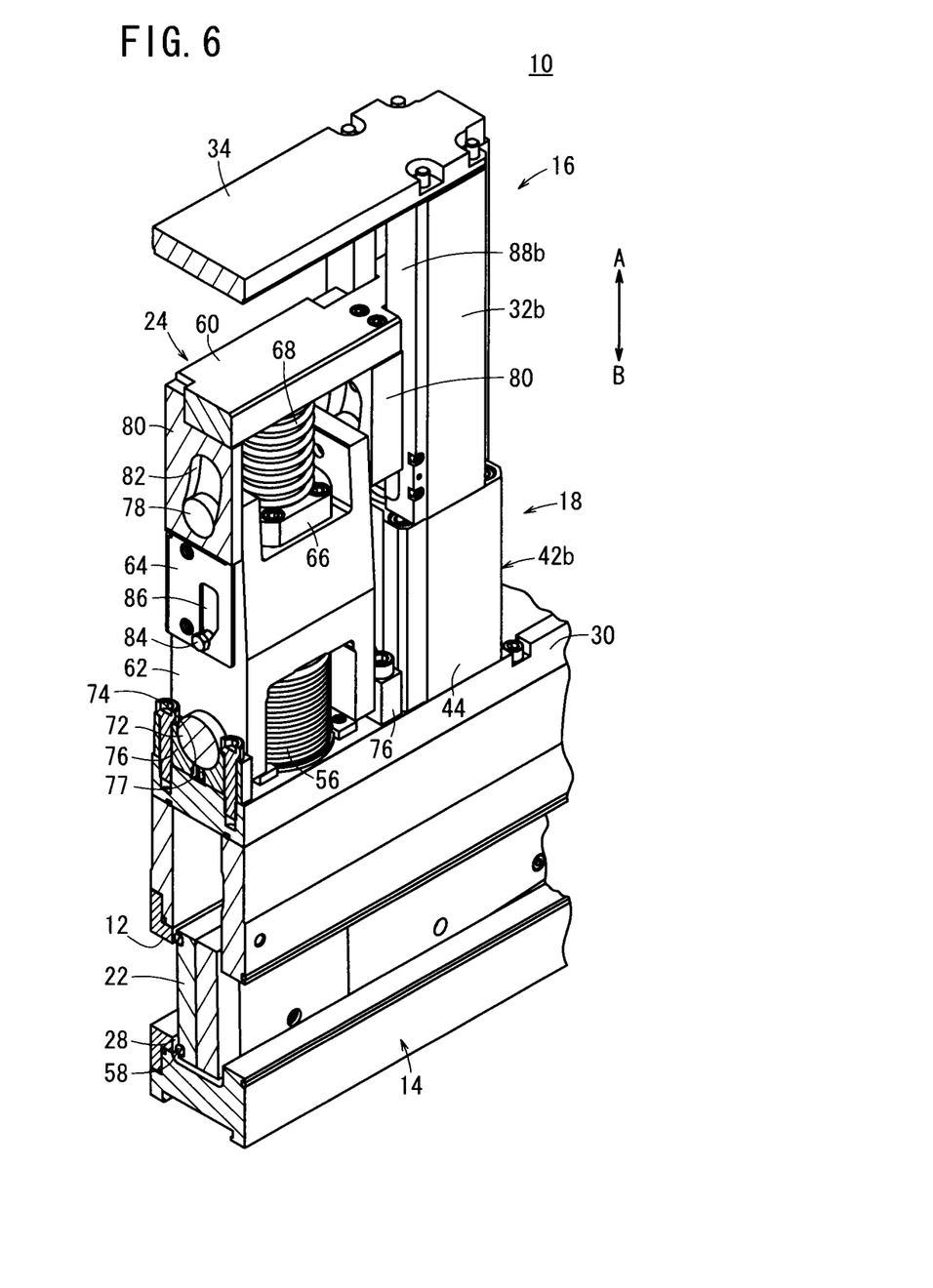
FIG. 6 is a perspective view, with a partial cutout cross section, of the gate valve shown in FIG. 4.

Consequently, as shown in FIGS. 3 through 5, the valve rod 20 and the valve disk 22, which are retained by the displacement block 62, are tilted integrally, and the valve disk 22 is seated on the valve seat 28 while pressing the sealing ring 58, whereby the passage 12 of the valve box 14 is blocked.

At this time, as shown in FIG. 5, the retaining rollers 90a, 90b abut respectively against the first and second pressure receiving bodies 92, 94 on the inner wall portions 88a, 88b, whereby loads imposed from the displacement block 62 that is tilted together with the valve disk 22 are imposed on the first and second pressure receiving bodies 92, 94. Therefore, loads from the displacement block 62 are prevented, through the connecting blocks 80 and the retaining rollers 90a, 90b, from being imposed directly on the inner wall portions 88a, 88b.

More specifically, in a valve closed state in which the valve disk 22 is seated on the valve seat 28, the retaining rollers 90a, 90b are made to abut against the first and second pressure receiving bodies 92, 94 having a high degree of hardness relative to the inner wall portions 88a, 88b, whereby rigidity in the valve closed state can be enhanced. As a result, the tilted condition of the displacement block 62 can be maintained reliably and stably, together with reliably and stably retaining the valve closed state by the valve disk 22.

Owing thereto, processing can be carried out on a workpiece such as a semiconductor wafer or the like in a processing chamber, the passage 12 of which has been closed and sealed.

Next, in the case that the valve disk 22 is separated away from the valve seat 28 and the passage 12 is placed in a valve open state, under a switching action of a non-illustrated switching valve, pressure fluid is supplied from the second port 40 to the lower side cylinder chambers 54 in the cylinder assembly 18. Consequently, the pistons 46 rise, and the piston rods 48 and the yoke 60 rise together with the pistons 46, such that the spring 68 expands and the displacement block 62, which is axially supported by the tilt rollers 78, is tilted counterclockwise (in the direction of arrow D in FIG. 11). Thus, the valve disk 22 is tilted together with the valve rod 20 and the valve disk 22 to separate away from the valve seat 28, whereby the blocked state of the passage 12 is released.

In addition, by introduction of pressure fluid into the lower side cylinder chambers 54 and elevation of the pistons 46, the piston rods 48 together with the yoke 60, the displacement block 62, the valve rod 20, and the valve disk 22 are raised integrally, whereupon the valve disk 22 is separated in an upward direction from the position facing the passage 12 inside the valve box 14, and the initial state with the valve open condition is restored (see FIGS. 8 through 10).

As a result, the passage 12 is placed in an open, i.e., communication enabled, state in the valve box 14, whereby a non-illustrated workpiece such as a semiconductor wafer or the like is capable of being transported through the passage 12, and the workpiece, on which processing has been performed in one processing chamber, is moved through the passage 12 into another adjacent processing chamber, and continued processing is carried out thereon.

In the foregoing manner, according to the present embodiment, because a structure is provided in which the displacement block 62 and the valve rod 20 are arranged between the pair of fluid pressure cylinders 42a, 42b that make up the cylinder assembly 18, compared to a situation in which a cylinder and a displacement block are arranged on a straight line, the height dimension of the gate valve 10 can be suppressed, and the gate valve 10 can be made smaller in scale.

Further, the retaining mechanism 26 is provided, which is made up from the inner wall portions 88a, 88b of the side frames 32a, 32b and the pair of retaining rollers 90a, 90b that are displaced along the inner wall portions 88a, 88b, such that if the valve disk 22 is seated on the valve seat 28 in a valve closed state, loads in a substantially horizontal direction, which are applied from the tilted displacement block 62 and the tilt rollers 78 through the connecting blocks 80, can be borne reliably and suitably by the first and second pressure receiving bodies 92, 94, which the retaining rollers 90a, 90b abut against. As a result, the closed (blocked) state of the passage 12 by the valve disk 22 can be reliably and stably maintained. Stated otherwise, by providing the retaining mechanism 26, a stable rigidity can be obtained, which enables the valve disk 22 to be seated on the valve seat 28.

The gate valve according to the present invention is not limited to the embodiment described above, and various additional or modified structures could be adopted as a matter of course without deviating from the essence of the invention as set forth in the appended claims.

What is claimed is:

1. A gate valve equipped with a valve box, a valve disk displaceable for being seated on a valve seat formed in the valve box, a valve rod connected to the valve disk for moving the valve disk along a straight line as well as tiltably moving the valve disk, and a driving section disposed in a housing connected to the valve box for linearly displacing the valve rod in an axial direction, the gate valve comprising:

a yoke connected to a drive shaft of the driving section and which is displaced along the axial direction under a driving action of the driving section;

a displacement member displaced integrally with the yoke, and which is tiltable at a terminal position along the axial direction;

an engagement member disposed on a side of the displacement member and having a hole therein into which a first roller mounted on the displacement member is inserted;

a frame disposed parallel to the axial direction of the valve rod and having a groove that extends along the axial direction;

a second roller disposed on the engagement member and which is inserted into the groove; and a pressure receiving member disposed to face toward the groove and which abuts against the second roller in a valve closed state in which the valve disk is seated on the valve seat, wherein the valve rod, the displacement member and the driving section are arranged in parallel in interior of the housing, and the pressure receiving member is formed from a material having a hardness greater than that of the frame.

2. The gate valve according to claim 1, wherein the second roller comprises a pair of second rollers separated mutually in a direction of displacement of the engagement member, and the pressure receiving member comprises a pair of pressure receiving members separated mutually in a direction of extension of the groove corresponding to the pair of second rollers.

3. The gate valve according to claim 1, wherein one of the pressure receiving members and another of the pressure receiving members are arranged to confront one another mutually in the frame while sandwiching the groove therebetween.

4. The gate valve according to claim 1, wherein the driving section is made up from a fluid pressure cylinder comprising a cylinder tube to which a pressure fluid is supplied to interior thereof, and a piston disposed displaceably inside the cylinder tube, the drive shaft being connected to the piston.

5. The gate valve according to claim 4, wherein the fluid pressure cylinder comprises two fluid pressure cylinders, which are disposed respectively at positions about the valve rod on both sides thereof in the interior of the housing.

6. The gate valve according to claim 1, wherein the pressure receiving members are formed from a metallic material.

7. The gate valve according to claim 2, wherein the pressure receiving members are disposed in recesses that face toward the groove, the pressure receiving members being arranged flush with side surfaces of the groove so as not to project outwardly with respect to the side surfaces.

8. The gate valve according to claim 3, wherein the one of the pressure receiving members and the other of the pressure receiving members are mutually offset from each other by a predetermined distance along the axial direction of the frame.

* * * * *

UNITED STATES PATENT AND TRADEMARK OFFICE
CERTIFICATE OF CORRECTION

| | |
|---|---|
| PATENT NO. | : 8,474,791 B2 |
| APPLICATION NO. | : 13/215601 |
| DATED | : July 2, 2013 |
| INVENTOR(S) | : Hiroshi Ogawa et al. |

It is certified that error appears in the above-identified patent and that said Letters Patent is hereby corrected as shown below:

In the Claims

Column 9, line 18, Claim 3, change "1" to --2--.

Signed and Sealed this
Twenty-sixth Day of November, 2013

Margaret A. Focarino
*Commissioner for Patents of the United States Patent and Trademark Office*